1

United States Patent Office 2,963,443
Patented Dec. 6, 1960

2,963,443

REACTIVATION OF MOLYBDENUM CONTAINING CATALYSTS

William G. Nixon, Westchester, Ill., assignor, by mesne assignments, to Universal Oil Products Company, Des Plaines, Ill., a corporation of Delaware No Drawing. Filed May 29, 1958, Ser. No. 738,601

13 Claims. (Cl. 252—416)

The present application is a continuation-in-part of my co-pending application Serial No. 595,863, filed July 5, 1956, now abandoned.

This invention relates to the reactivation of molybdenum-containing catalytic composites, and is specifically directed toward the reactivation, through the utilization of particular oxides of nitrogen, of catalysts comprising cobalt and molybdenum as the catalytically active metallic components.

Catalytic composites to which the method of the present invention is particularly applicable have found varied utility in many commercial industries such as the pharmaceutical, detergent, insecticidal, and heavy chemical. These catalysts are generally employed in the treating or purification of various organic compounds, and are especially utilized within the petroleum industry for the treatment of various hydrocarbon mixtures and fractions. Catalytic composites, particularly those which contain cobalt in conjunction with the molybdenum, are readily adapted to processes for treating hydrocarbon fractions to remove various undesirable metallic impurities including lead, copper, arsenic, etc., and non-metallic impurities such as sulfurous and nitrogenous compounds. In addition, these catalytic composites are also employed for the purpose of saturating, or hydrogenating, substantially all the olefinic hydrocarbons in any given mixture of hydrocarbons. Briefly, the advantages achieved through the utilization of catalysts containing molybdenum as the sole active metal component, or in combination with cobalt and/or other metallic components, are to be found, for the most part, in processes employed for treating, purification, hydrogenation, etc.

Whatever the industry, reaction, or purpose for which the catalyst is employed, it is extremely essential, for commercial acceptability, that the particular catalyst exhibit a prolonged capability for performing its intended function, as well as exhibit a high degree of activity in effecting such function. After extended periods of use, these catalysts usually become deactivated, losing thereby their capability to perform as desired. Such deactivation is seldom sudden; most often it occurs through a gradual decline in activity until such time as the catalyst is no longer active to the necessary, desired degree.

Catalyst deactivation may result from any one or a combination of adverse effects. These effects may, in turn, result from substances which are peculiar to a particular catalyst, and which either result in a change in the physical state of the components of the catalyst or result in a loss of said components. These impurities usually take the form of solids which cover the catalytically active centers and surfaces, thereby effectively shielding the same from the materials being processed. Catalyst deactivation may also result directly from a change in the state of the active metallic components. This change may be an increase in the size of the metallic crystal, a change in the valence state and/or a change in the physical or chemical association with the other components of the catalyst.

Generally, the deposition of coke or other carbonaceous material is a direct cause of catalyst deactivation, and exists in conjunction with one or more of the hereinabove set forth causes of catalytic deactivation. A widely utilized method for regenerating a catalyst, which has been deactivated by a deposition of carbonaceous material, is by burning the catalyst in a free oxygen-containing gas, usually air, at elevated temperatures. It is well known that this method removes effectively the carbonaceous material, oxidizes the metallic component to a higher valence state, and to all appearances produces an active catalyst. The activity of the regenerated catalyst is, however, less than the activity of the catalyst prior to use. This is due usually to the state of the metal component which may not have been reverted to its original state, and which may have, in fact, been adversely affected by the oxidation procedure during the removal of carbonaceous material. Further, regeneration effected through the use of a free oxygen-containing gaseous material quite often produces substances which are inherently detrimental to catalyst activity. For example, when carbonaceous material is subjected to burning in a stream of oxygen, carbon monoxide is produced, and carbon monoxide is a substance having a pronounced deactivating action on metal-containing catalysts.

Usually, the catalyst will, after regeneration, function acceptably for a period of time less than that which has been experienced with the new, fresh catalyst. This obviously necessitates a second regeneration which, in turn, produces a catalyst less desirable than the catalyst before regeneration. Thus, successive regenerations result in catalysts which exhibit shorter periods of acceptable activity than exhibited after each preceding regeneration. Eventually, it becomes necessary to replace completely the catalyst, further regeneration not being economically feasible, and, in many instances, improbable.

The object of the present invention is to provide a method, for the reactivation of a deactivated catalyst composite comprising molybdenum, which method effectively reconstitutes the active metallic components, and produces a reactivated catalyst possessing a high degree of activity as well as the capability to function acceptably for an extended period of time.

In one embodiment, the present invention relates to a method for reactivating a deactivated molybdenum-containing, refractory inorganic oxide catalyst which comprises subjecting said deactivated catalyst to treatment with an oxide of nitrogen selected from the group consisting of $N_2O_3$, $NO_2$, $N_2O_5$ and mixtures thereof, without removing the molybdenum component from the catalyst.

In another embodiment, the present invention provides a method for reactivating a deactivated molybdenum-containing, refractory inorganic oxide catalyst which comprises oxidizing said deactivated catalyst with air and thereafter treating said catalyst with an oxide of nitrogen selected from the group consisting of $N_2O_3$, $NO_2$, $N_2O_5$ and mixtures thereof without removing said molybdenum component from said catalyst.

In a specific embodiment, the present invention relates to a method for reactivating a deactivated alumina-cobalt-molybdenum catalyst which comprises oxidizing said deactivated catalyst in air at a temperature of from about 300° C. to about 700° C., thereafter subjecting said catalyst to treatment, in the presence of halogen, at a temperature of from about 25° C. to about 1000° C., with an oxide of nitrogen selected from the group consisting of $N_2O_3$, $NO_2$, $N_2O_5$ and mixtures thereof, removing said oxide of nitrogen, without removing the cobalt and molybdenum components, and thereafter subjecting said catalyst to a reducing treatment with hydrogen at a temperature in the range of from about 25° C. to about 1000° C.

As hereinbefore set forth, molybdenum-containing catalytic composites, particularly those which also contain cobalt, are employed throughout commercial industry in a variety of processes. A great majority of these catalysts comprise only molybdenum and cobalt as the catalytically active metal components. However, other metals can be composited with either the molybdenum alone, or in combination with the cobalt and molybdenum. It is understood that these catalysts would not be removed from the broad scope of the present invention. Such other metals include nickel, vanadium, manganese, iron, gold, silver, etc.; it is not intended to limit unduly this invention to those specifically named. Catalysts which comprise combinations of two or more different metals, or their compounds, may also be benefited by the process of this invention. It is understood that these metal components may be either in the elemental state, in combination as oxides, halides, sulfides, etc., or exist as mixtures of two or more of such combined forms.

Whatever the metal component, it is generally composited with a highly refractory inorganic oxide such as alumina, silica, zirconia, silica-alumina, silica-zirconia, silica-alumina-zirconia, silica-thoria, silica-alumina-thoria, alumina-magnesia, silica-alumina-magnesia, etc. It is understood that these refractory oxides may be made in any suitable manner including separate, successive, or co-precipitation methods of manufacture, or they may be naturally occurring substances such as clays or earths which may or may not be purified or activated with special treatment. It has been found that the purposes of utilizing a molybdenum catalyst are enhanced through the use of alumina or alumina-silica, and, therefore, these are the preferred refractory inorganic oxides.

Molybdenum-containing catalysts have been prepared by a number of varied methods, a most common method being the introduction of molybdenum to the carrier material in the form of a solution of ammonium molybdate, subsequently converting the molybdenum therein to molybdenum oxide. A more recent method involves the utilization of solutions of molybdic acid, or soluble salts of molybdenum and oxalic acid with the subsequent conversion to molybdenum oxide. Other metals, hereinabove set forth, may be utilized with the molybdenum; the compositing of these metallic components with the molybdenum is generally effected through the utilization of a soluble salt of said metallic component. For example, a catalyst which comprises molybdenum and cobalt may be prepared by commingling solutions of molybdenum nitrate and cobalt nitrate, and compositing the resulting mixture, commonly referred to as an impregnating solution, with the catalytically active, refractory inorganic oxide carrier material.

Whatever the method of manufacture, the molybdenum-containing catalyst so produced and ultimately deactivated in use may be reactivated by the process of the present invention. As hereinbefore set forth the present invention provides a method of reactivating a deactivated molybdenum-containing catalyst through specific treatments with $N_2O_3$, $NO_2$, $N_2O_5$ and mixtures thereof, which method will yield a catalyst with an increased degree of activity, lengthening thereby the period of time during which the catalyst is capable of performing as desired.

It is preferred to subject the deactivated catalyst to air oxidation prior to the oxidizing treatment with one of the hereinbefore stated oxides of nitrogen. Oxidation in an atmosphere of air will remove a substantial amount of the carbonaceous material deposited upon the catalyst, thereby enhancing the economical advantages of utilizing said oxides of nitrogen. The pre-oxidation treatment may employ any suitable free oxygen-containing gaseous material; air is preferred due to its natural abundance, the economical feasibility of its utilization and the fact that it exerts no permanent detrimental effects toward the metallic components. The pre-oxidation with air, or any other suitable free oxygen-containing gaseous substance, not only removes substantially completely the coke and carbonaceous material, but effectively prepares the catalyst for the subsequent treatment with one of the oxides of nitrogen hereinbefore described.

It is understood that these oxides of nitrogen may or may not be employed per se. They may be utilized as mixtures comprising two or more such as $NO_2$ and $N_2O_3$, $N_2O_5$ and $NO_2$, etc. Said oxides of nitrogen may be admixed with various diluents such as air, nitrogen, etc., and, as hereinbefore stated, halogen is preferably present. Said oxides of nitrogen may result from other compounds and mixtures which either yield the same at reaction conditions, or form them in situ. For example, $N_2O_5$ is known to yield $N_2O_4$ (an equilibrium form of $NO_2$) at the conditions specific to the present invention.

Although a marked improvement in activity has been observed through the utilization of the method of the present invention in the absence of halogen, the preferred method of reactivating the catalyst is that which is effected in the presence of halogen. The use of chlorine and/or bromine is preferred, although fluorine and iodine may be utilized. Any suitable concentration of halogen, from an amount which yields a marked improvement, to an amount which is uneconomically in excess, may be used. It is preferred that said halogen be present in excess of about 0.1% by weight of the refractory oxide. It is understood that although the use of any of these halogens will increase the activity resulting from reactivation, they are not equivalent, and different halogens may be employed with different catalysts.

In accordance with the present invention, the halogen may be present in any form, and may be added in any suitable manner. Said added halogen may be in the elemental state or existing as a combined halide such as, but not limited to, HCl, $CCl_4$, and alkyl halides such as ethyl chloride, propyl chloride, methyl chloride, butyl chloride, etc. The halogen may be a component of the catalyst which is to be activated, and may comprise mixtures of two or more of the halides, whether as components of the catalyst, or as halogen which is to be added.

To further improve the activity of the catalyst, it is desirable to subject said catalyst to a reducing treatment. Prior to said reducing treatment, it is necessary that the catalyst be stripped of the oxide of nitrogen by being subjected to a sweeping treatment. The sweeping or stripping agent may be any gaseous substance not having a reducing action on said oxidizing agent. Examples of suitable sweeping agents are, the following: air, nitrogen, carbon dioxide, or mixtures of the same, etc. It is essential that said reducing agent is not employed in the presence of an oxide of nitrogen, and thus, nitric oxide (NO) is inapplicable, due to its inherent reducing action. Nitrous oxide ($N_2O$) has been found to be incapable of reconstituting the metallic component.

The preferred method of reactivating a deactivated catalyst comprising a molybdenum metal component composited with a refractory oxide in the presence of halogen such as, for example, a cobalt-molybdenum-alumina-chloride catalyst, is to subject said catalyst to air oxidation at a temperature of from about 300° C. to about 700° C., and further to subject said catalyst, at a temperature in excess of 25° C., with an upper limit of from about 800° C. to about 1000° C. to treatment with an oxide of nitrogen selected from the group consisting of $N_2O_3$, $NO_2$, $N_2O_5$ and mixtures thereof, following this latter treatment by sweeping the composite with air to remove traces of the oxide of nitrogen, and thereafter subjecting said catalyst to a reducing treatment with hydrogen at a temperature in excess of 25° C. with an upper limit of from about 800° C. to about 1000° C. The preferred method employs a temperature of from about 300° C. to about 700° C. for the oxidation, oxide-of-nitrogen, sweeping, and reducing treatments. The reducing treatment may be omitted in those instances where, as a normally integral part of the process for which the catalyst is intended, said catalyst is first subjected to the action of a suitable reducing agent. It is further understood that the method of this invention may employ either downflow, upflow, or crossflow in a closed vessel, or countercurrent or concurrent flow through a fixed, fluidized or continuously moving bed of catalyst.

The following example is introduced to further illustrate the utility of the present invention; it is not intended to limit unduly the present invention to the specific materials and conditions involved.

EXAMPLE

An alumina base was prepared from a mixture of equal volumes of a 28% by weight solution of hexamethylene tetramine in water and an aluminum chloride hydrosol containing 12% by weight aluminum and 10.8% by weight chloride. The mixture was formed into spheres by the oil-drop method which were washed, dried to a temperature of 650° C. and then calcined at 650° C.

The alumina spheres, containing combined chloride, were seeped in an aqueous solution of cobalt nitrate and ammonium molybdate of sufficient concentration to deposit 6.0% by weight of molybdenum and 2.2% by weight of cobalt, based upon the total weight of the final composite. The impregnated spheres were evaporated to dryness, raised to a temperature of 650° C. and calcined at this temperature for a period of one hour. It is believed that this high-temperature procedure converts the metallic components to the stable oxide form thereof.

A portion of the alumina-cobalt oxide-molybdenum oxide-chloride catalyst was subjected to an activity test which consisted of passing a standard hydrocarbon charge stock over said catalyst in an atmosphere of hydrogen at a temperature of 700° F., a liquid hourly space velocity (defined as volumes of hydrocarbon per hour per volume of catalyst within the reaction zone) of 3.0, and under a pressure of 800 p.s.i.g. The degree of catalyst activity is ascertained by the amounts of sulfur and nitrogen (basic) removed from the hydrocarbon stream, and by the decrease in the bromine number of said hydrocarbon. The latter is an indication of the quantity of olefinic hydrocarbons remaining in the product stream.

A second portion of the cobalt oxide-molybdenum oxide catalyst was deactivated by being employed in the desulfurization of a hydrocarbon charge stock until said catalyst exhibited 65% of the original activity as is determined by the above described activity test. A portion of this deactivated cobalt oxide-molybdenum oxide catalyst was treated in accordance with the method of the present invention by being placed in a furnace tube and brought to a temperature of 500° C. A stream of air was passed through the furnace tube at a temperature of 500° C. for a period of one hour. This was followed by a stream of nitrogen dioxide ($NO_2$) at a rate of 50 cc. per minute for a period of about five minutes, and further followed by a stream of air at a temperature of 500° C. for a period of one hour to remove traces of $NO_2$. The catalytic composite was then subjected to a reducing treatment with hydrogen at a temperature of 500° C. for a period of one hour. The furnace tube was cooled, the catalyst removed and subjected to the activity test, hereinabove described, for determination of the degree of sulfur and nitrogen removal, and the degree of decrease in the bromine number.

The results of the activity tests are given in the following table; the benefits obtained by the method of the present invention are readily ascertained. In addition, the $NO_2$-treated catalyst exhibited a definite color change. The untreated portion was dark blue, the deactivated portion was effectively black, and the $NO_2$-treated portion was light blue. This significant color change is indicative of the change in the state of the metallic components brought about through the use of an oxide of nitrogen in accordance with the method of the present invention.

Table

|  | Without Treatment | Deactivated | With $NO_2$ Treatment |
|---|---|---|---|
| Nitrogen, Basic, p.p.m. | 2–4 | 3–6 | 1.2 |
| Bromine Number | 1.0 | 1.5 | 0.1 |
| Sulfur, Wt. Percent | 0.01 | 0.02 | 0.003 |
| Carbon, Wt. Percent | 1.40 | 2.10 | 0.71 |

The activity test on the $NO_2$-treated catalyst portion yielded totally unexpected results in that said treated cobalt oxide-molybdenum oxide catalyst was significantly more active than the same catalyst prior to use and deactivation (further indicated by the distinct color change). There was a definite decrease in the amount of nitrogen and sulfur remaining in the standard hydrocarbon test stock, after being processed over the reactivated catalyst, and, of greater significance, a large decrease in the bromine number, a direct measurement of the quantity of olefinic hydrocarbons remaining.

When these unexpected results became known, the three catalyst portions were analyzed to determine the amount of carbon deposition resulting from the activity tests. The $NO_2$-treated catalyst portion indicated 50% by weight less carbon than the unused catalyst portion. This is extremely significant, for catalysts which exhibit a high degree of activity usually have deposited thereon relatively large amounts of carbonaceous material. Conversely, the lower the degree of activity, the lesser the amount of carbon deposition. Further, there was indicated no loss of the cobalt and/or molybdenum components from the composite.

The foregoing specification and example clearly illustrate the method of the present invention, as employed in reactivating a deactivated cobalt-molybdenum catalytic composite, and indicate the benefits afforded through the utilization thereof. It is not intended, however, to limit unduly the method of the present invention to any extent other than that set forth within the spirit and scope of the appended claims.

I claim as my invention:

1. A method for reactivating a deactivated molybdenum-containing, refractory inorganic oxide catalyst which comprises subjecting said deactivated catalyst, at a temperature of from about 25° C. to about 1000° C., to the action of an oxide of nitrogen selected from the group consisting of $N_2O_3$, $NO_2$, $N_2O_5$ and mixtures thereof, without removing the molybdenum component from said catalyst, stripping said oxide of nitrogen from said catalyst with a gas not having a reducing action on said oxide of nitrogen, and thereafter subjecting said catalyst to a reducing treatment with hydrogen at a temperature of from about 25° C. to about 1000° C.

2. The method of claim 1 further characterized in that said catalyst comprises cobalt and molybdenum.

3. The method of claim 1 further characterized in that said catalyst is oxidized with air at a temperature of from about 300° C. to about 700° C. prior to the treatment with said oxide of nitrogen.

4. A method for reactivating a deactivated cobalt and molybdenum-containing, refractory inorganic oxide catalyst without removing the cobalt and molybdenum therefrom which comprises oxidizing said deactivated catalyst with air at a temperature of from about 300° C. to about 700° C., thereafter treating said catalyst, at a temperature of from about 25° C. to about 1000° C., with an oxide of nitrogen selected from the group consisting of $N_2O_3$, $NO_2$, $N_2O_5$ and mixtures thereof, stripping said oxide of nitrogen from said catalyst with a gas not having a reducing action on said oxide of nitrogen, and thereafter subjecting said catalyst to a reducing treatment with hydrogen at a temperature of from about 25° C. to about 1000° C.

5. The method of claim 4 further characterized in that said refractory inorganic oxide comprises alumina.

6. The method of claim 4 further characterized in that said refractory inorganic oxide comprises alumina and silica.

7. A method for reactivating a deactivated alumina-cobalt-molybdenum catalyst without removing the cobalt and molybdenum therefrom which comprises subjecting said deactivated catalyst to oxidation with a free oxygen-containing gas at a temperature of from about 300° C. to about 700° C., thereafter treating said catalyst with an oxide of nitrogen selected from the group consisting of $N_2O_3$, $NO_2$, $N_2O_5$ and mixtures thereof at a temperature of from about 25° C. to about 1000° C., stripping said oxide of nitrogen from said catalyst with a gas not having a reducing action on said oxide of nitrogen, and thereafter subjecting said catalyst to a reducing treatment with hydrogen at a temperature of from about 25° C. to about 1000° C.

8. The method of claim 7 further characterized in that said deactivated catalyst is subjected to the action of said oxide of nitrogen in the presence of halogen in excess of 0.1% by weight.

9. The method of claim 8 further characterized in that said halogen comprises chlorine.

10. A method for reactivating a deactivated alumina-cobalt-molybdenum catalyst without removing the cobalt and molybdenum therefrom which comprises oxidizing said deactivated catalyst in air at a temperature of from about 300° C. to about 700° C., thereafter subjecting said catalyst to treatment, at a temperature of from about 25° C. to about 1000° C. and in the presence of halogen in excess of 0.1% by weight, with an oxide of nitrogen selected from the group consisting of $N_2O_3$, $NO_2$, $N_2O_5$ and mixtures thereof, stripping said oxide of nitrogen from said catalyst with a gas not having a reducing action on said oxide of nitrogen, and thereafter subjecting said catalyst to a reducing treatment with hydrogen at a temperature of from about 25° C. to about 1000° C.

11. The method of claim 10 further characterized in that said oxide of nitrogen is $N_2O_3$.

12. The method of claim 10 further characterized in that said oxide of nitrogen is $NO_2$.

13. The method of claim 10 further characterized in that said oxide of nitrogen is $N_2O_5$.

References Cited in the file of this patent

UNITED STATES PATENTS

| | | |
|---|---|---|
| 1,678,627 | Jaeger | July 24, 1928 |
| 2,381,659 | Frey | Aug. 7, 1945 |

FOREIGN PATENTS

| | | |
|---|---|---|
| 744,429 | Great Britain | Feb. 8, 1956 |